Nov. 23, 1965   A. BELTRAMI   3,219,897
STARTING SYSTEM FOR SYNCHRONOUS ELECTRIC MOTORS
Filed May 29, 1961   2 Sheets-Sheet 1

INVENTOR
AURELIO BELTRAMI

BY Ostrolenk, Faber, Gerb & Soffen
ATTORNEY

Nov. 23, 1965   A. BELTRAMI   3,219,897
STARTING SYSTEM FOR SYNCHRONOUS ELECTRIC MOTORS
Filed May 29, 1961   2 Sheets-Sheet 2

INVENTOR
AURELIO BELTRAMI

BY *Ostrolenk, Faber, Gerb & Soffen*
ATTORNEY

United States Patent Office 3,219,897
Patented Nov. 23, 1965

3,219,897
STARTING SYSTEM FOR SYNCHRONOUS
ELECTRIC MOTORS
Aurelio Beltrami, Via Circo, 4, Milan, Italy
Filed May 29, 1961, Ser. No. 113,329
Claims priority, application Italy, May 31, 1960,
Patent 632,918
4 Claims. (Cl. 318—171)

The present invention relates to a starting system for synchronous motors, particularly low power motors specially designed for applications requiring a number of such motors to run in absolute synchronism both as to speed and phase.

In such an application, said motors must be supplied from the same line or source of current or, in any case, in such a way as will guarantee that the supply voltages to all motors used for such application, have identical phase and frequency.

The main object of the invention is the system and device for starting such motors; starting which must take place in such a way as to insure at all times and in any one instant, the same angular position of the rotors in the various motors connected up in the system in which they are used.

More precisely, according to said starting system, a voltage at a gradually increasing frequency, starting from zero frequency to the operating frequency of the motors is provided. Such a system has the advantage, in respect to the others already known, of not requiring any substantially greater power for starting than is required while running.

The accompanying drawings illustrate the invention in a nonrestrictive example of same, wherein:

FIG. 1 is a perspective view of a type of small motor with part of its outer housing cut away particularly suitable for applications to which the invention is relating to.

Figure 1:
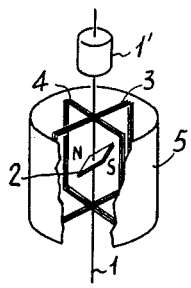

The diagram of the motor shown in FIG. 1 clearly shows how on shaft 1 of the motor, a magnetic needle 2 is pinned as a rotor, around which rotor and at right angles to one another are placed two fixed coils or windings 3 and 4 of the type wound on frame, suitable to pass alternating current capable of generating a rotating magnetic field. Numeral 5 is used to represent the motor's outside magnetic shield and 1' is an indicator referring to the position of the rotor.

Figure 2:
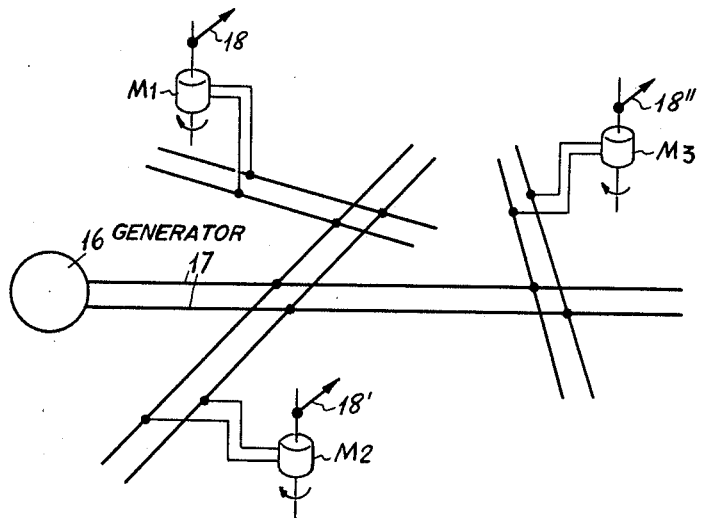
FIG. 2 shows diagrammatically such an application where a number of motors like that shown in FIG. 1 are connected to a starting and feeding device according to the invention.

FIG. 2 shows a power distribution network 17 supplied by generator 16 which, by way of different branches and ramifications, supplies three motors of the type shown in FIG. 1 and indicated as M1, M2, and M3.

Each of the shafts of these motors has a pointer or indicator mounted on it, shown as 18, 18' and 18", respectively, which, at all times, occupy the same angular position in respect to a given, fixed direction, making possible the use of this type of motor for special, interesting applications, as can readily be understood.

Figure 3:
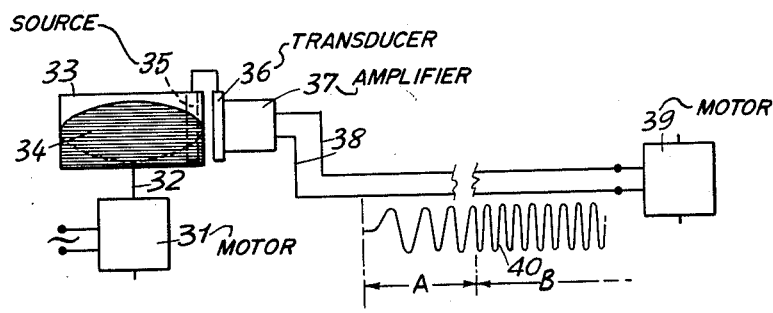
FIG. 3 is a schematic illustration of an embodiment of the starting device.

The motor starting system being the object of the invention is illustrated in FIG. 3, and it is particularly suitable for those applications in which one or more motors, belonging to equipment controlled by a pilot apparatus or transmitter, is supplied by alternating current or current supplied in pulses, generated electronically by the motor of the transmitter and then transmitted by radio or by wire to the motors of the receiving apparatus.

Figure 4:
FIG. 4 represents the curve of the oscillograms used in FIG. 3.

According to this system, as can be seen in the diagram in FIG. 3, an oscillogram 34, the curve of which is shown in FIG. 4, being partially transparent and partially opaque to radiations (light, radioactive rays issued from suitable isotopes, or other suitable type) issuing from a narrow slit from a source 35, is placed on a drum 33 which is pinned to shaft 32 of motor 31 of the pilot or transmitting apparatus. The radiations issuing from the slit are modulated by rotating oscillogram 34 and are then directed to a transducer 36 which transforms these modulated radiations into an electrical signal, of phase and frequency corresponding exactly to the variations in intensity and form of the aforementioned radiations, as modified by said oscillogram.

An amplifier 37, for example a phototransistor type amplifier, is combined with said transducer 36 and the voltage thus amplified is sent, by way of wires 38 (or by radio) to motor 39, or to a number of motors in the receiving apparatus or in a number of such receivers.

The voltage and the corresponding electrical current generated by the system shown in FIG. 3 will, at first, have a frequency of gradually increasing value, corresponding to the motor 31 starting from zero speed and then increasing its speed until attaining operating speed and then maintain a constant frequency equal to that of synchronism.

Diagram 40 (FIG. 3) shows a schematic diagram of what has been explained immediately above, namely, that during the starting time interval for the motors, represented by portion A, the supply current to the motor or motors 39 will increase in frequency, while, over the portion which follows, B, which corresponds to the entire period of time during which the motor functions successively, the frequency of said current is constant and equal to the frequency of synchronism which characterizes the motors, themselves.

In this way, motor 39 will start slowly, but will, after period of time A, reach the speed of synchronism, this happening without requiring a greater amount of power for starting than that consumed while running at operating speed. That is, if motor 39 ordinarily requires 1 watt of power for starting, while at operating speed it consumes only one-tenth of a watt, upon using the system herein described, the motor will be able to start up consuming only one-tenth of a watt. This constitutes an enormous advantage for those cases, such as herein considered, in which the motor supply current is supplied through an amplifier. In fact, any technician or engineer in the field will readily appreciate the considerable saving in size, cost and weight, making it possible to reduce the power output of the amplifier to ten times less than its actual output.

The starting system will prove particularly advantageous for those applications in which the motors in question are already connected up to rotating drums carrying oscillograms as for applications already pointed out in other patents by the same applicant.

Naturally the constructional details of the motors and of the starting devices described herein and the material used for same, can be varied to meet requirements, without, however, falling outside the scope of this invention.

What I claim is:

1. Starting apparatus for a synchronous motor which is fed by a current generated from the rotation of a pilot synchronous motor, and comprising: a drum pinned to the shaft of the pilot motor and carrying an oscillogram for modulating a beam of radiations directed towards a transducer for transforming said radiations into an electrical quantity corresponding to the form and frequency of the rotation of the pilot motor; means for amplifying said electrical quantity and supplying said amplified quantity to said synchronous motor, said electrical quantity during the starting period, corresponding to the starting period of the pilot motor, and gradually increasing in frequency until reaching the frequency of synchronism, so as not to require a starting power any greater than that required to run the synchronous motor at normal operating speed.

2. Starting apparatus for a low power synchronous motor, particularly suitable for applications requiring such synchronous motor to operate in strict synchronism with other synchronous motors, while being fed by a current generated from the rotation of a synchronous pilot motor and characterized in that said starting apparatus comprises a drum keyed to the shaft of said pilot motor, said drum having disposed within it a source of radiation, said drum having a cylindrical wall on which is traced an oscillogram for modulating a beam of radiations coming from said source and directed towards a transducer for transforming said radiations into an electrical signal having form and frequency corresponding to the rotation of said pilot motor, and means for amplifying said electrical signal and feeding said amplified signal to said synchronous motor, said electrical signal having during the starting period a frequency corresponding to the frequency of rotation of said pilot motor during its starting period and gradually increasing frequency until reaching the frequency of synchronism, said gradually increasing frequency of the feeding current of the motor allowing the starting of said synchronous motor at a power substantially equal to that required for operation at normal operating speed.

3. A starting apparatus as set forth in claim 2, further characterized in that said beams of radiation are radioactive emanations issued from suitable isotopes.

4. A starting apparatus as set forth in claim 2, further characterized in that the oscillogram mounted on said rotating drum is formed of a single sinusoidal wave.

References Cited by the Examiner
UNITED STATES PATENTS

| | | | |
|---|---|---|---|
| 388,004 | 8/1888 | Schallenberger | 318—220 |
| 538,648 | 5/1895 | Arnold | 318—220 |
| 1,475,583 | 11/1923 | Hoxie | 250—233 |
| 2,493,079 | 1/1950 | Mott et al. | 318—171 |
| 2,493,519 | 1/1950 | Baltosser. | |
| 2,500,628 | 3/1950 | Clark. | |
| 2,578,037 | 12/1951 | Berlant | 250—219 X |
| 2,624,848 | 1/1953 | Hancock et al. | 250—208 |

JOHN F. COUCH, *Primary Examiner.*